Oct. 28, 1958 F. E. NAGEL 2,858,163
ADAPTER ASSEMBLY FOR CONVERTING VEHICLE AXLES
FROM SEMI-FLOATING TO FULL FLOATING
Filed May 10, 1957 2 Sheets-Sheet 1

Frederick E. Nagel
INVENTOR.

BY
Attorneys

Oct. 28, 1958  F. E. NAGEL  2,858,163
ADAPTER ASSEMBLY FOR CONVERTING VEHICLE AXLES
FROM SEMI-FLOATING TO FULL FLOATING
Filed May 10, 1957  2 Sheets-Sheet 2
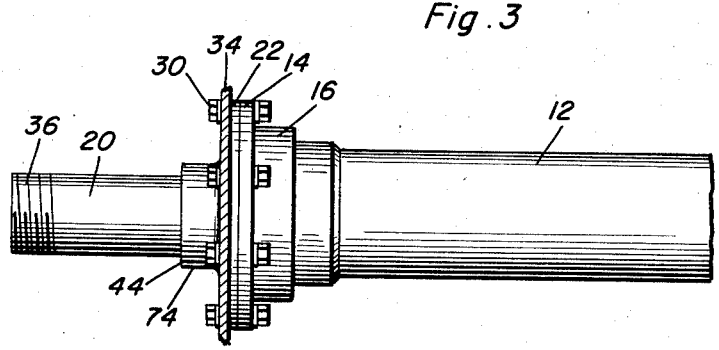
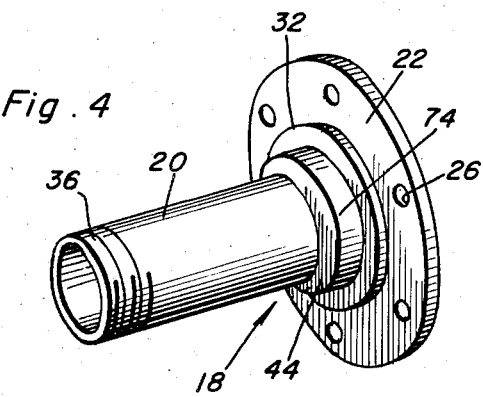
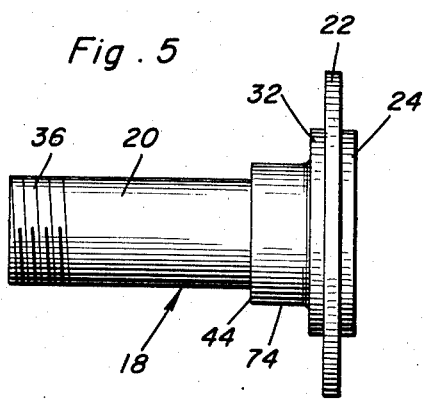
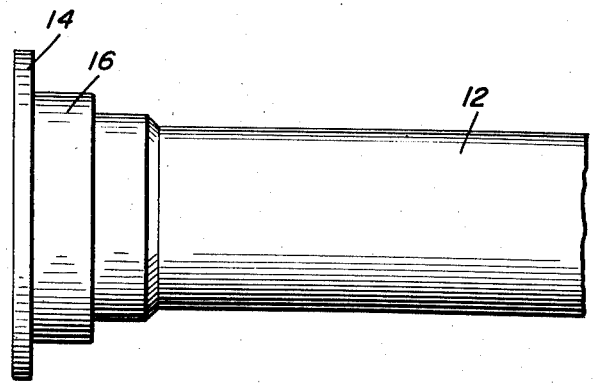
Frederick E. Nagel
INVENTOR.

United States Patent Office 2,858,163
Patented Oct. 28, 1958

2,858,163

ADAPTER ASSEMBLY FOR CONVERTING VEHICLE AXLES FROM SEMI-FLOATING TO FULL FLOATING

Frederick E. Nagel, Gardena, Calif.

Application May 10, 1957, Serial No. 658,314

1 Claim. (Cl. 301—1)

The present invention generally relates to an adapter assembly for converting vehicle axles from the semi-floating type to the full floating type without the necessity of replacing the entire axle assembly and without modifying any portion of the existing structure thus enabling the axle to be reconverted to the semi-floating type if desired.

An object of the present invention is to provide an adapter assembly for converting a semi-floating rear axle into a full floating rear axle in which the axle assembly may be readily restored to its original form.

Another object of the present invention is to provide an assembly in accordance with the present invention which is adaptable to most passenger cars and light trucks and is useful in increasing load capacity, in increasing dependability and in simplifying servicing.

Another object of the present invention is to provide an adapter assembly in accordance with the preceding object in which a conversion spindle is provided and by increasing the length of the spindle, the tread of the vehicle can be increased for stability or to provide clearance for employing dual wheels.

Another important object of the present invention is to provide an adapter assembly for converting the rear axle of a load carrying vehicle from the semi-floating type to the full floating type, the load weight of the vehicle being carried on a spindle forming an extension of the axle housing with the wheel carrying hub rotatably supported on bearings on the spindle so that only drive torque is transmitted by the drive axle shafts, thus eliminating the necessity of the drive axles supporting any of the weight of the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view with the backing plate being shown in section and illustrating the manner in which the cylindrical extension or spindle is attached to the end of the existing axle housing;

Figure 4 is a perspective view of the spindle;

Figure 5 is a side elevational view of the spindle of Figure 4; and

Figure 6 is a side elevational view of the end of the axle housing.

Figure 1:
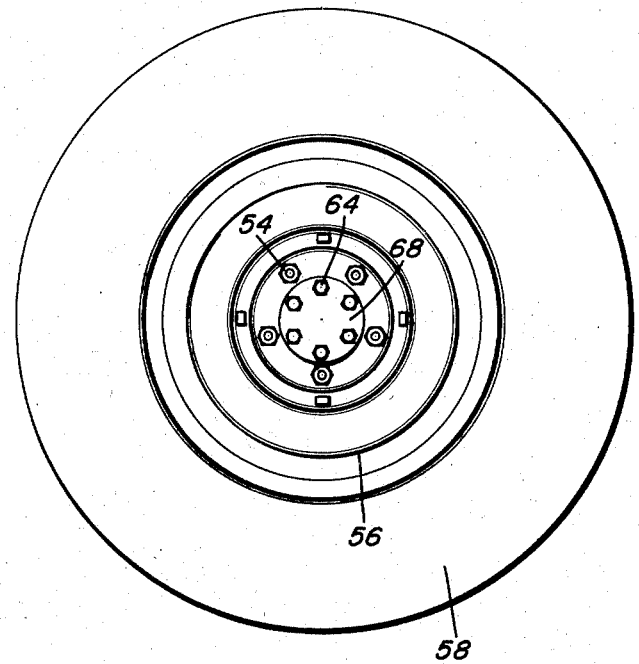
Figure 1 is an elevational view of a drive wheel with the adapter assembly of the present invention installed thereon after the semi-floating axle has been converted to a full floating axle.
Figure 2:
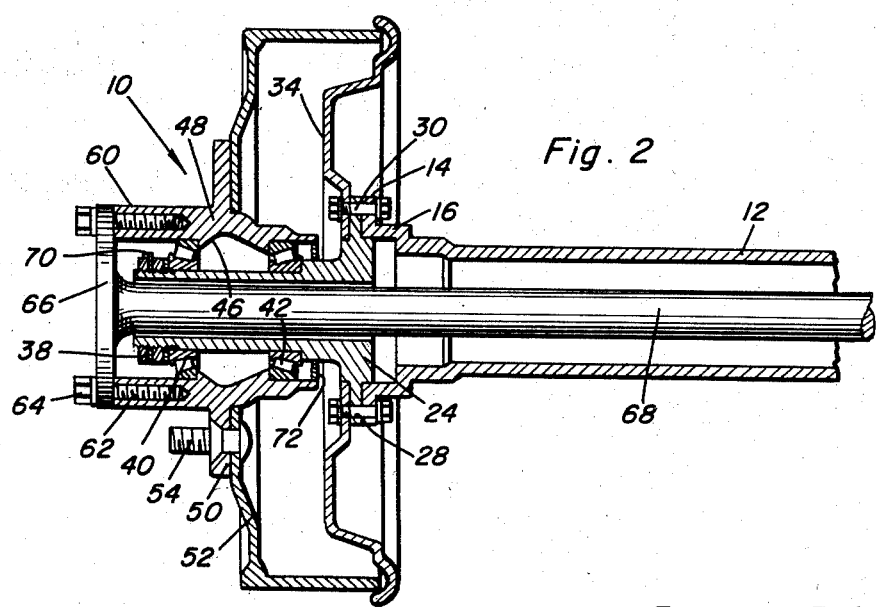
Figure 2 is a longitudinal, vertical sectional view taken substantially upon a plane passing along the longitudinal center of the converted axle structure showing the details of construction thereof and the association of the elements of the adapter assembly.

Referring now specifically to the drawings, the numeral 10 generally designates the adapter assembly of the present invention with Figure 2 illustrating the arrangement of the adapter assembly in relation to the axle housing 12 after the semi-floating axle shaft and bearing therefor have been removed therefrom. It is pointed out that the adapter assembly 10 will be identical for both driving wheels at the remote ends of the axle housing 12. The outer end of the axle housing 12 is provided with a peripheral flange 14 and a cylindrical bearing receiving portion 16, with the semi-floating axle shaft being supported by the bearing which is normally received in the bearing receiving portion 16.

The adapter assembly 10 includes a spindle generally designated by the numeral 18 which includes an elongated cylindrical member 20 having a projecting peripheral flange 22 adjacent the inner end thereof, with a cylindrical projection 24 being disposed inwardly of the flange 22 for telescopic close fitting engagement with the bearing receiving portion 16. The flange 22 is substantially the same size as the flange 14 and includes openings 26 therein for alignment with the openings 28 in the flange 14 whereby fastening bolts 30 extend through the flange 22 and the flange 14 for rigidly securing the spindle 18 to the end of the axle housing 12, with the cylindrical member 20 being in coaxial alignment with the axle housing 12.

Inwardly of the flange 22 is provided an annular shoulder 32 which receives a brake backing plate 34 thereon with the bolts 30 also extending through the brake backing plate for rigidly mounting the same to the flanges 22 and 14.

The outer end of the cylindrical portion 20 of the spindle 18 is externally screw threaded as indicated by numeral 36 for receiving a retainer nut 38 which holds an outer tapered roller bearing assembly 40 in position. An inner tapered or inclined roller bearing assembly 42, identical to the roller bearing assembly 40, is disposed adjacent the inner end of the cylindrical portion 20 and abuts a peripheral shoulder 44 at the inner end thereof. The outer races of the roller bearing assemblies 40 and 42 engage shoulders 46 on the interior surface of a wheel supporting hub 48 that is provided with a peripheral flange 50 having a brake drum 52 secured to the inner surface thereof and provided with wheel supporting lugs 54 projecting from the outer surface thereof for receiving a wheel 56 having the usual pneumatic tire 58 mounted thereon.

The hub 48 is provided with a cylindrical extension 60 having a plurality of inwardly extending threaded sockets 62 for receiving cap screws or retaining bolts 64 extending through the driving flange 66 on the outer end of the axle shaft 68 which has the inner end thereof received within the differential gear in the same manner as the replaced semi-floating axle shaft. It is noted that the bearing retainer nut 38 may be provided with a transverse key 70 to prevent unwanted rotation thereof for retaining the roller bearing assemblies 40 and 42 in position and for retaining the hub 48 journaled on the spindle 18. A lubricant seal 72 is provided at the inner end of the hub 48 and engages the outer surface of the shouldered portion 74 of the spindle between the shoulder 32 and shoulder 44 for preventing leakage of lubricant into the interior of the brake drum 52. It is pointed out that any suitable type of brake mechanism may be provided for association with the backing plate 34 and the brake drum 52 in the usual manner.

In assembling the present invention for converting a semi-floating axle to a full floating axle, the semi-floating axle and its supporting bearing are completely removed from the axle housing. The spindle 18 along with the backing plate 34 are then assembled onto the axle housing 12 by employing the fastening bolts 30. The hub 48, brake drum 52, roller bearing assemblies 40 and 42 and the retaining nut 38 are then assembled onto the spindle 18, with the hub 48 and brake drum 52 being rotatable on the cylindrical portion 20 thereof. The full floating axle shaft 68 is then inserted into the cylindrical portion 20 of the spindle 18 and moved on inwardly through the axle housing 12 for engagement with the differential gear in the same manner as was the replaced semi-floating axle shaft. The driving flange 66 on the outer end of the axle shaft 68 is then attached to the hub 48 by employing the fastening bolts 64 for transmitting torque from the axle shaft 68 to the wheel mounted on the hub 48.

The operation of the invention is such that the load weight of the vehicle using this converted axle is carried on the spindle attached as an extension to the axle housing. The hub, brake drum, wheel and tire assembly rotate on bearings around the spindle. The drive torque to the wheels is transmitted through drive axle shafts turning coaxially in the axle housing and spindles and the drive axle shafts do not support any of the weight of the vehicle. The main advantage of this converted axle assembly over the replaced semi-floating axle is that the load of the vehicle is carried on the extension axle spindles attached to the axle housing. Therefore, if a drive axle shaft or any other portion of the drive line fails, the vehicle may be towed without lifting it from the road. If the vehicle has four wheel drive, it may be driven by the front axle. Another advantage is that the axle may be disassembled for maintenance without special tools such as wheel pullers, axle pullers, or bearing pullers, and the differential assembly may be removed without first removing the wheels. Also, the adapter assembly of the present invention may be removed and the axle reconverted back to a semi-floating type if desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In a final drive assembly, a rear axle housing having a flanged outer end, and provided thereat with an enlarged recess for receiving a bearing to support a semi-floating axle, a brake backing plate adapted to be secured to said outer end of the housing, an adapter spindle for converting a semi-floating axle assembly to a full floating assembly, said spindle being hollow and having a cylindrical portion at its inner end of a width less than the depth of said recess but having an external diameter substantially equal to the internal diameter thereof so as to be snugly received therewithin, said spindle having a radial flange integral therewith immediately adjacent said cylindrical portion engaged with said flanged portion of the housing and sandwiched between said backing plate and said flanged portion of the housing by fastening means extending therethrough, said spindle being of elongate cylindrical configuration at its outer end and forming an extension of said axle housing, an axle disposed within said axle housing and projecting therefrom outwardly through said spindle to terminate in an enlarged flange beyond the outer end of the spindle, and a wheel assembly fixed to said enlarged flange of the axle and journaled and supported solely upon said cylindrical portion of the spindle whereby only torsional forces are transmitted by said axle.

References Cited in the file of this patent

UNITED STATES PATENTS

| | | |
|---|---|---|
| 2,052,524 | Baker | Aug. 25, 1936 |
| 2,424,578 | Mortag | July 29, 1947 |
| 2,529,330 | Double | Nov. 7, 1950 |
| 2,532,605 | Castleberry | Dec. 5, 1950 |
| 2,693,393 | Heth | Nov. 2, 1954 |

FOREIGN PATENTS

| | | |
|---|---|---|
| 405,274 | Italy | Aug. 2, 1943 |